Nov. 17, 1953  C. T. SKILLMAN ET AL  2,659,229
HUBCAP WITH LOCKING MEANS
Filed Jan. 22, 1951  2 Sheets-Sheet 1

Claude T. Skillman
Mitchell Kistner
INVENTORS

BY *Clarence A. O'Brien*
*and Harvey B. Jackson*
Attorneys

Nov. 17, 1953
C. T. SKILLMAN ET AL
2,659,229
HUBCAP WITH LOCKING MEANS
Filed Jan. 22, 1951
2 Sheets-Sheet 2
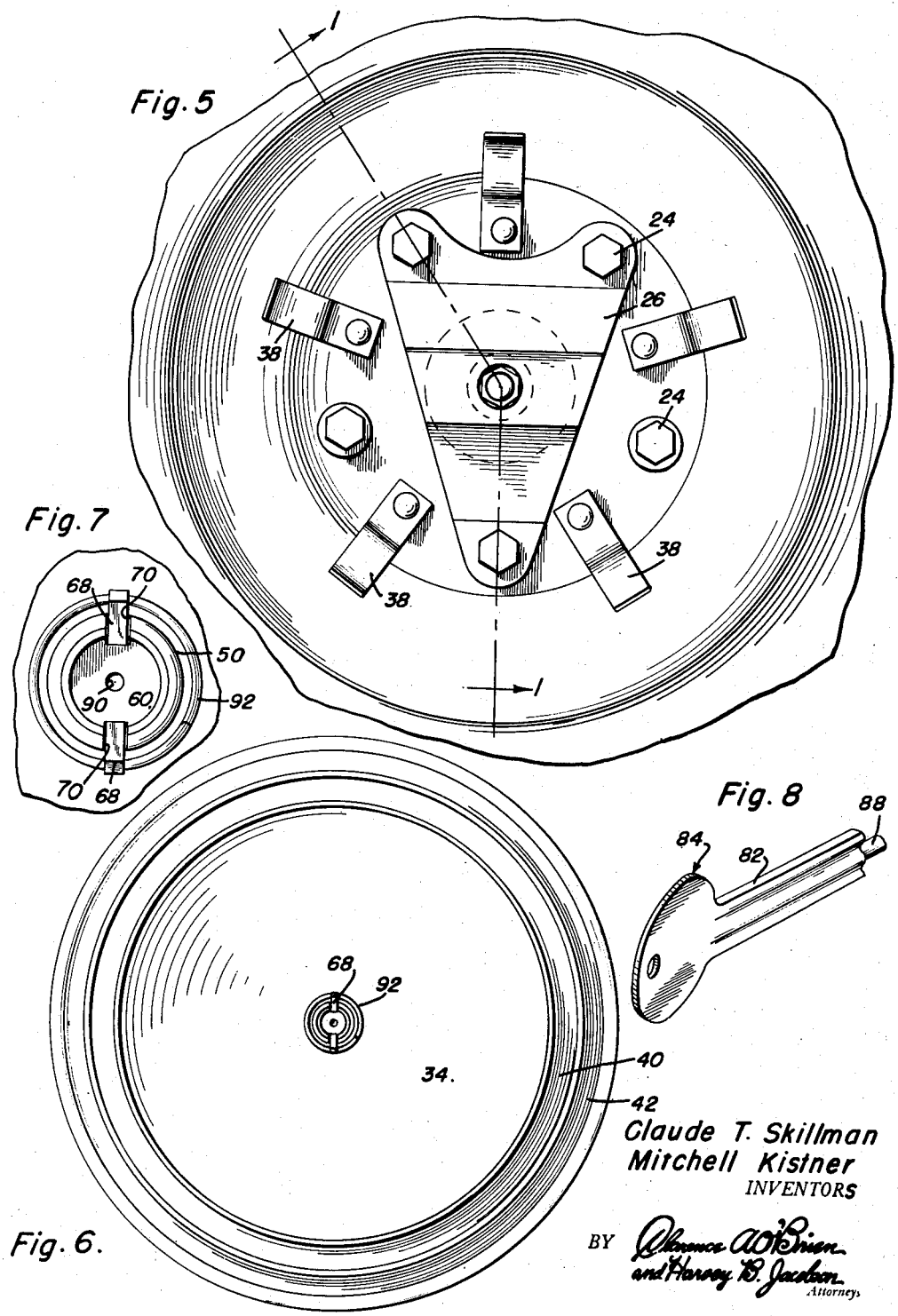
Claude T. Skillman
Mitchell Kistner
INVENTORS Patented Nov. 17, 1953

2,659,229

UNITED STATES PATENT OFFICE 2,659,229

HUBCAP WITH LOCKING MEANS

Claude T. Skillman and Mitchell Kistner, Santa Maria, Calif.

Application January 22, 1951, Serial No. 207,122

3 Claims. (Cl. 70—259)

This invention relates to new and useful improvements and devices for preventing the theft of wheels from automotive vehicles, and more particularly relates to means for locking a hub cap in its protective position housing the studs and nuts by which the wheel is attached to the vehicle.

The primary object of the present invention is to provide a device which may be readily used in conjunction with conventional wheels and the means by which these wheels are attached to the vehicle to prevent the removal of the wheel from the vehicle without the use of a particular key provided for this purpose.

Another important object of the present invention is to provide a device of this character which will not require any modification whatsoever of conventional vehicle hubs, the conventional wheels, nor the conventional means by which the wheels are secured to the hubs, in its use.

Another object of the present invention closely allied with the preceding objects of the present invention is to provide an anti-theft device which is retained in its protective position by the conventional means utilized to secure the wheels of a vehicle to the axle driven hub.

Still another important object of the present invention is to provide a device of this character which may be readily installed, and which will permit, by the use of a key, the quick removal of the hub cap so that access may be had to the wheel securing means.

A meritorious feature of the present invention resides in the fact that the mounting bracket requires no special securing means, and is secured to the hub and the wheel by the conventional studs and bolts provided for their attachment.

Another important feature of the present invention resides in the provision of a locking hub cap construction which may be used in conjunction with the conventional hub cap normally provided, and which requires only a slight modification in the latter for such use.

Still another important feature of the present invention resides in the novel key operated means provided for securing the locking hub cap to the mounting bracket, as well as the provision of the compression spring for urging the locking hub cap away from the mounting bracket and tensioning the latch elements against the mounting bracket, whereby the locking hub cap may be readily removed without requiring the use of a special prying tool when the latch elements are released, and whereby tension is placed upon the movable parts of the assembly to prevent rattle.

A final important feature of the present invention to be specifically enumerated herein resides in the simplicity of the same and the resulting low cost of manufacture thereof, together with the efficiency and the durability of the device in use.

These, together with various ancillary objects and features of the invention which will become apparent as the following description proceeds, are attained by the present invention, a preferred embodiment of which has been illustrated by way of example only in the accompanying drawings, wherein:

Figure 5 is a side elevational view of the structure shown in Figure 1 with the locking hub cap removed;

Figure 6 is a side elevational view of the inside of the locking hub cap;

Figure 7 is an enlarged side elevational view of the inner end of the locking means; and Figure 8 is a perspective view of a key suitable for use in the present invention.

Figure 1:
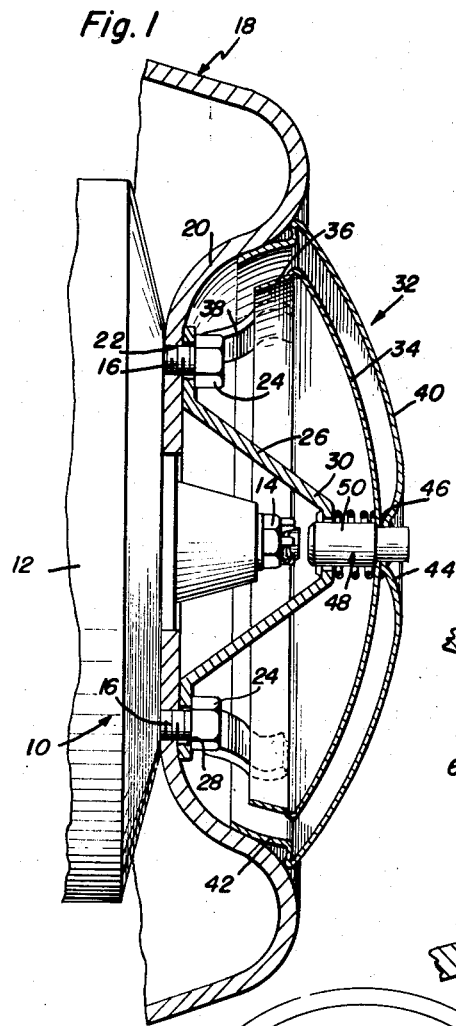
Figure 1 is a sectional view taken upon the plane of the broken section line 1—1 of Figure 5, and in addition to the structure shown in Figure 5, this view shows the manner in which the locking hub cap engages the wheel and is secured to the mounting bracket.

Reference is now made more specifically to the accompanying drawings, wherein like numerals designate similar parts throughout the various views, and in which the reference numeral 10 designates generally a rotatable hub construction including a rotatable hub 12 that is secured by the usual means 14 to an axle not shown. Conventionally, the hub 12 is provided with a plurality of threaded axially extending studs 16 by means of which a wheel (only partially shown) designated generally at 18 is secured to the hub 12. The central portion 20 of the wheel 18 is concaved and is provided with a plurality of openings 22 therethrough through which the studs 16 extend, the wheel 18 being secured to the hub 12 by means of nuts 24 threaded on the studs 16.

It will be appreciated that the structure thus far described is conventional and forms the basis for the attachment of the present invention to be now described. A triangular shaped mounting bracket 26 is provided having attaching openings 28. The bracket 26 is positioned with three of the studs 16 extending through the openings 28 with three of the nuts 24 retaining the bracket 26 in fixed relation to the wheel 18 and the hub 12 as clearly shown in Figures 1 and 5. It will be noted that the central portion 30 of the bracket 26 is offset to be spaced from the axle and the securing means 14.

A hub construction designated generally at 32 is provided which includes an inner hub cap 34 which is removably retained in position by means of a securing rim 36 that is frictionally engaged by a plurality of spring clips 38 suitably secured to the central portion 20 of the wheel 18. An outer or locking hub cap 40 is provided, which, as shown in Figure 1, has peripheral flanges 42 that extend into the concaved central portion 20 and are adapted to engage the wheel 18 so as to form in conjunction with the concaved central portion 20 a housing for the nuts 24, the bracket 26, the securing means 14, and the inner hub cap 34.

The central portion 44 of the locking hub cap 40 is depressed, as clearly shown in Figure 1, and is secured as by welding or the like 46 to the central portion of the inner hub cap 34.

A locking construction designated generally at 48 is provided, which locking construction 48 includes a housing 50 that extends through aligned openings 52 in the hub caps 34 and 40. The outer surface of the housing 50 is provided with a shoulder 54 that is seated against the inner surface of the hub cap 34, and the housing 50 is retained in fixed relation with respect to the hub caps by means of welding or the like 56 securing the central portion 44 of the hub cap 40 to the housing 50.

Suitably fixed within the housing 50 is a thimble or cap which includes cylindrical side walls 58 and an integral end wall 60. A pair of generally V-shaped members 62 are disposed within the housing 50 and extend through diametrically opposed slot in the side walls 58. The apices 66 of the V-shaped members 62 extend in opposed relation and are in rolling contact with the housing 50 so that the V-shaped members 62 are oscillatably mounted within the housing 50, with the slot 64 preventing rotation of the members 62 about the longitudinal axis of the housing 50.

Figure 2:
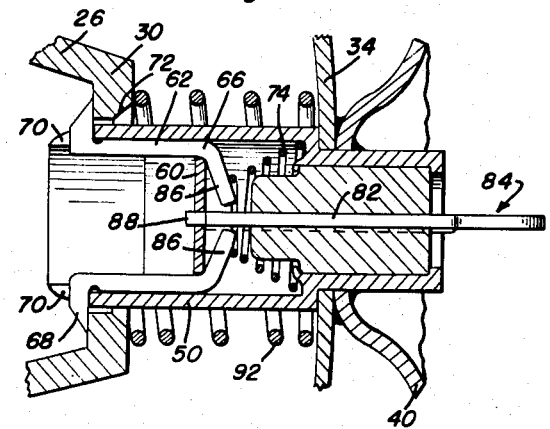
Figure 2 is an enlarged central sectional detail view of the locking means, showing the locking means in locking engagement with the mounting bracket.

The outer ends of the V-shaped members 62 are provided with oppositely extending locking dogs 68, which, as shown in Figure 2, extend outwardly through slots 70 at the inner end of housing 50 to engage the portion 30 of the bracket 26 when the members 62 are oscillated to an extreme position in one direction, it being noted that the portion 30 of the bracket 26 is provided with a central opening 72 into which the housing 50 removably extends. Upon comparing Figure 2 to Figure 3, it will be seen that the members 62 may be oscillated from the locking position shown in Figure 2 to a position in which the locking dogs 68 are disengaged from the portion 30.

Means is provided for yieldingly urging the locking dogs 68 into their extended or locking position, such means including a coil compression spring 74 disposed in the housing 50 and is seated between the ends of the members 62 remote from the locking dogs 68 and an internal shoulder 76 formed in the housing 50. It will be appreciated that the spring 74 tends to urge the ends of the members 62 remote from the locking dogs 68 toward each other so that the members 62 oscillate about their apices 66 to move the locking dogs 68 outwardly.

Figure 3:
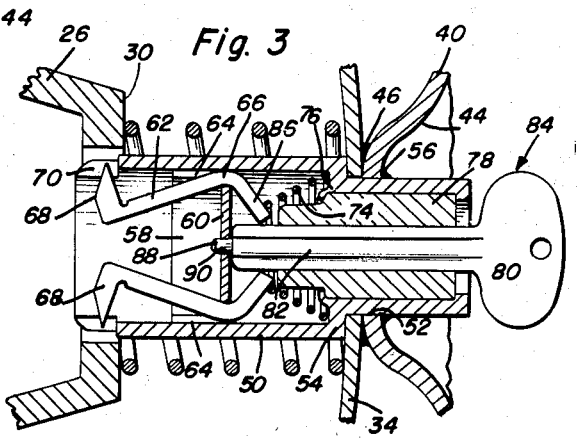
Figure 3 is a sectional view similar to that shown in Figure 2, however, this view showing the locking means disengaged from the mounting bracket.
Figure 4:
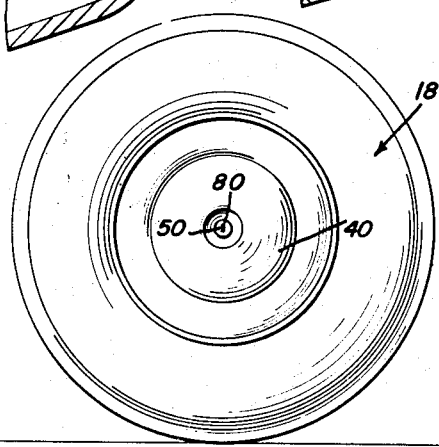
Figure 4 is a side elevational view showing the outer side of the locking hub cap.

Means is provided for spreading the ends of the members 62 remote from the locking dogs 68 so as to move the locking dogs 68 against the action of the spring 74 to the retracted position shown in Figure 3. Such means comprises a cylindrical element 78 journaled in the housing 50 having an opening 80 therethrough complementary to the shank portion 82 of the key designated generally at 84 shown in Figure 8.

It will be noted that the shank 82 of the key 84 is generally flat and may be inserted between the ends 86 of the members 62 when the latter are in a locking position as shown in Figure 2. It will also be appreciated that the spacing of the ends 86 is such that upon rotation of the key 84 the latter will spread the ends 86 apart by a camming action from the position shown in Figure 2 to that shown in Figure 3.

The inner end of the key 84 is provided with a cylindrical projection 88 that is slidably received in an opening 90 provided in the end wall 60 so as to insure axial alignment of the key 84 with the housing 50.

It will be evident that the element 78 may be a conventional tumbler if desired; however, such construction is not required in the present invention inasmuch as it is thought that the unique shape of the opening 80 and the shank 82 of the key will afford sufficient protection.

In order to assure easy removal of the locking hub cap construction 32 from the wheel 18 when the locking dogs 68 are disengaged from the bracket 26, a coil compression spring 92 is disposed to surround the housing 50 and is seated between the bracket 26 and the inner hub cap 34, it being noted that the spring 92 provides suitable tension on the movable elements of the construction to avoid rattles and the like.

The advantages of the present invention will be readily apparent. It will be readily apparent upon inspection of Figure 1, that the locking hub cap construction prevents access to the nuts 24 without the use of the key 84, so that unauthorized persons may not tamper with the nuts 24 or remove the wheel 18. An important function of the present invention resides in the fact that upon removal of a torsion force on the key 84 to unlock the hub caps, the spring 74 bears upon the inner ends 86 of the members 62 to cause the inner ends 86 to cam the key 84 and consequently the element 78 to the normal position shown in Figure 2, so that no difficulty will be experienced in re-inserting the shank 82 of the key 84 between the inner ends 86 when it is desired to unlock the same. While the form of the invention disclosed shows that the shank 82 of the key 84 constitutes the cam to spread the inner ends 86, it will be appreciated that the element 78 may be provided with a flat extension (not shown) which is normally disposed between the inner ends 86, so that upon merely turning the element 78 by a key, the inner ends 86 will be spread to unlock the device.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A lock assembly comprising a bracket having a central opening, latching means secured to said bracket including a housing having one end located within said opening, a pair of V-shaped members mounted in said one end of said housing, each V-shaped member having an inner and outer end, oppositely projecting latch elements at the outer ends of the members normally engaging the bracket, a transverse plate in said housing, the members pivotally disposed between said plate and the housing, a tumbler lock mechanism secured in the other end of said housing, a compression spring partially surrounding said lock mechanism and bearing on the inner ends of said members and a portion of said housing, said spring urging said inner ends of the members towards each other and the latch elements away from each other, and a key receivable in said lock mechanism to cam the inner ends of said members away from each other and the latch elements toward each other and out of engagement with the bracket.

2. The lock assembly of claim 1, wherein said key is rotated to produce the camming action.

3. A lock assembly comprising a bracket having a central opening, latching means secured to said bracket including a housing having one end located within said opening, a pair of V-shaped members mounted in said one end of said housing, each V-shaped member having an inner and outer end, oppositely projecting latch elements at the outer ends of the members normally engaging the bracket, a transverse plate in said housing, the members pivotally disposed between said plate and the housing, a compression spring retained in said housing and bearing on the inner ends of said members, said spring urging said inner ends of the members towards each other and the latch elements away from each other, and means receivable endwise in said housing between the members to cam said inner ends of the members away from each other and the latch elements towards each other and out of engagement with the bracket.

CLAUDE T. SKILLMAN.
MITCHELL KISTNER.

References Cited in the file of this patent

UNITED STATES PATENTS

| Number | Name | Date |
|---|---|---|
| 1,533,629 | Best | Apr. 14, 1925 |
| 1,601,359 | Harrington | Sept. 28, 1926 |
| 1,883,032 | Smith | Oct. 18, 1932 |
| 2,316,936 | Davis | Apr. 20, 1943 |
| 2,345,949 | Robbins | Apr. 4, 1944 |
| 2,493,366 | Simcich | Jan. 3, 1950 |
| 2,535,126 | Flowers et al. | Dec. 26, 1950 |